United States Patent
Wang et al.

(10) Patent No.: US 10,910,985 B2
(45) Date of Patent: Feb. 2, 2021

(54) VEHICLE ELECTRIC MOTOR CLOSED-LOOP POSITION HOLDING CONTROL

(71) Applicant: Ford Global Technologies, LLC, Dearborn, MI (US)

(72) Inventors: Jiyao Wang, Canton, MI (US); Wei Xu, Canton, MI (US); Silong Li, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 16/207,480

(22) Filed: Dec. 3, 2018

(65) Prior Publication Data
US 2020/0177121 A1   Jun. 4, 2020

(51) Int. Cl.
*H02P 27/12* (2006.01)
*H02P 21/18* (2016.01)
*H02P 21/22* (2016.01)

(52) U.S. Cl.
CPC .............. *H02P 27/12* (2013.01); *H02P 21/18* (2016.02); *H02P 21/22* (2016.02)

(58) Field of Classification Search
CPC ........... H02P 27/12; H02P 21/16; H02P 21/22
See application file for complete search history.

(56) References Cited

U.S. PATENT DOCUMENTS

| | | | |
|---|---|---|---|
| 5,646,496 A | 7/1997 | Woodland et al. | |
| 6,525,502 B1 | 2/2003 | Piedl et al. | |
| 7,362,070 B2 | 4/2008 | Games et al. | |
| 2011/0029179 A1* | 2/2011 | Miyazaki | B60L 50/16 701/22 |
| 2012/0303189 A1* | 11/2012 | Namuduri | B60W 50/029 701/22 |
| 2014/0306626 A1* | 10/2014 | Sonoda | H02P 21/22 318/400.02 |
| 2017/0334294 A1* | 11/2017 | Chen | B60L 3/04 |

FOREIGN PATENT DOCUMENTS

CA   2263378 A1   2/1999

* cited by examiner

*Primary Examiner* — Kawing Chan
*Assistant Examiner* — Bradley R Brown
(74) *Attorney, Agent, or Firm* — David B. Kelley; Brooks Kushman P.C.

(57) ABSTRACT

An electric drive system has a motor including a rotor, an inverter, and a controller. The controller perturbs a position of the rotor via a pulse width modulation (PWM) command to the inverter such that the motor receives an Id current that changes during the perturbing and an Iq current, and responsive to the Iq current settling at zero during the perturbing, alters the PWM command to cause the rotor to rotate.

19 Claims, 2 Drawing Sheets

VEHICLE ELECTRIC MOTOR CLOSED-LOOP POSITION HOLDING CONTROL

TECHNICAL FIELD

This disclosure relates to the control of vehicle electric motors.

BACKGROUND

An electric motor (eMotor) in a hybridipure electric vehicle, servo system, or robot arm has a position sensor that measures rotor position. This position signal is used for eMotor operation. For the eMotor to produce correct torque, the control algorithm needs to know the orientation angle of the eMotor rotor.

The position sensor is mounted on the rotor, so it rotates with the rotor. That is, the delta change of position sensor angle is equal to the delta change of rotor angle.

SUMMARY

An electric drive system includes a motor including a rotor, an inverter, and a controller. The controller, responsive to a start-up operation, initiates a pulse width modulation (PWM) command to the inverter to perturb the rotor, and responsive to an Id motor current becoming negative and an Iq motor current settling at zero, alters the PWM command to rotate the rotor.

An electric drive system includes a motor including a rotor, an inverter, and a controller. The controller perturbs a position of the rotor via a pulse width modulation (PWM) command to the inverter such that the motor receives an Id current that changes during the perturbing and an Iq current, and responsive to the Iq current settling at zero during the perturbing, alters the PWM command to cause the rotor to rotate.

A method for operating an electric drive system includes, by a controller, initiating a pulse width modulation (PWM) command to an inverter to perturb a rotor responsive to a start-up operation, and altering the PWM command to rotate the rotor responsive to an Id motor current becoming negative and an Iq motor current settling at zero.

DETAILED DESCRIPTION

Figure 1:
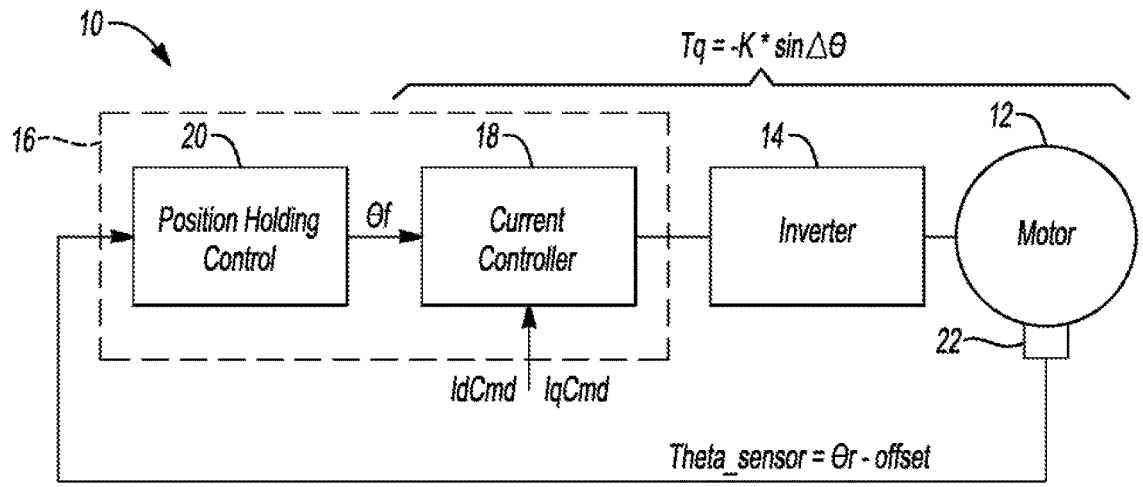
FIG. 1 is a schematic diagram of a motor system.

Various embodiments of the present disclosure are described herein. However, the disclosed, embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

An algorithm is needed to detect and record the constant difference (offset) between the position sensor angle and the actual rotor angle. During normal operation, control software may use this offset to adjust the raw signal of the position sensor to obtain the rotor position angle.

The rotor position can be easily detected if the eMotor is allowed to spin. Alternatively, to detect the initial position of the rotor without spinning the eMotor, one needs an inverter (i.e., a motor drive). An algorithm controls the inverter to 'scan' the eMotor around its airgap circumference to detect the rotor angle.

The inverter injects a voltage signal to the eMotor around its circumference. In general, there are two types of voltage injection: 1) the injected voltage can be continuous high frequency injection in sinusoidal or triangle shapes, and 2) the voltage can be discrete pulses injected at different rotor angles. Meanwhile, the current of the eMotor phase winding is sampled and measured by the inverter. Since the current response is related to the rotor position, one can extract the position information from the measured current.

The voltage injection method is in general effective, but it relies on the relation between injected voltage and measured current. This relation is decided by the motor inductance variation, and hence it has two drawbacks: 1) when the eMotor does not have saliency (which means the motor inductance is not changing at different rotor angles), this method does not generally work, and 2) this method cannot easily distinguish between 180 deg and 0 deg (because the motor inductance is changing as a function of 2*rotor_angle, so 180 deg and 0 deg have the same response).

It is proposed, in one example, to operate the eMotor with an arbitrary angle at the beginning, and control motor current under this arbitrary angle. Meanwhile, close-loop position holding control to hold the motor position sensor angle is performed. After a certain convergence time, the actual rotor angle will be detected by the close-loop position holding control. Then the offset between actual rotor angle and position sensor angle will be recorded in software for example and used in normal operation.

This strategy offers several advantages including that the eMotor is not spinning, it does not require eMotor saliency, it can distinguish between 0 deg and 180 deg, and a minimum control change is needed.

At the beginning, any arbitrary d-axis is randomly picked, and it does not necessarily align with the actual d-axis of the motor. When there is current flowing in the arbitrary d-axis, this current can be decomposed into the actual motor d-axis and actual q-axis. The actual q-axis current in the motor will produce torque. Consequently, the eMotor will tend to be perturbed, and the rotor angle will tend to change. A slight change in the rotor angle can be captured by the position sensor so we will know the rotor is being perturbed.

Assuming in one example the arbitrary axis orientation angle is θf and the actual rotor axis angle is θr, the difference is $$\theta r - \theta f = \Delta\theta$$

When the d-axis current (IdCmd) and zero IqCmd based on θf is controlled for this example, the actual current in the eMotor θr is $$Id = IdCmd * \cos\Delta\theta$$

$$Iq = IdCmd * \Delta\theta$$

And, the torque produced is $$Tq = 1.5\ P*[Iq*\lambda pm - Id*Iq*(Lq-Ld)] = 1.5\ P*IdCmd*$$
$$[\lambda pm - IdCmd*\cos\Delta\theta*(Lq-Ld)]*\sin\Delta\theta$$

where P is the motor number of pole-pairs, λpm is the permanent magnet flux linkage, and Ld and Lq are the d-axis and q-axis inductance of the motor, respectively. Then, the equation can be simplified into $$Tq = -K*\sin\Delta\theta, \text{ where } K = 1.5\ P*-IdCmd*[\lambda pm - IdCmd*\cos\Delta\theta*(Lq-Ld)]$$

A negative value of IdCmd is chosen such that λpm is sufficiently greater than −IdCmd * (Lq−Ld). Of course, the choice of IdCmd can be other values, but a positive K makes it easier to design the control algorithm. Please also notice that when Δθ is small enough, any negative value of IdCmd can guarantee a positive value of K.

The proposed algorithms are based on the position sensor signal to perform close-loop position holding control by adjusting the arbitrary d-axis orientation to hold the position sensor angle, as shown in FIG. 1. The algorithm runs until there is no torque and the rotor angle no longer tends to change. At the end, the arbitrary d-axis θf is aligned with the actual d-axis θr. Please notice that, Theta_sensor is the position sensor signal but the offset is unknown and this offset is the value to be detected.

With regard to FIG. 1, an electric drive system 10 includes a motor 12 including a rotor, an inverter 14, a controller 16 including a PWM current controller 18 and a position holding control 20, and a position sensor 22.

There are many possible position holding control algorithms that can be used to hold the position. The input of the algorithm is the measured position signal Theta_sensor and the output is the arbitrary axis orientation angle θf. The close-loop control algorithm is designed such that θf is actively adjusted, so the PWM current controller 18 will generate (using known switching schemes) a PWM command for the inverter 14 based on θf, IdCmd, and IqCmd such that the motor 12 produces the desired torque (Tq of FIG. 2) to perturb the motor 12 and hold the position angle.

Figure 2:
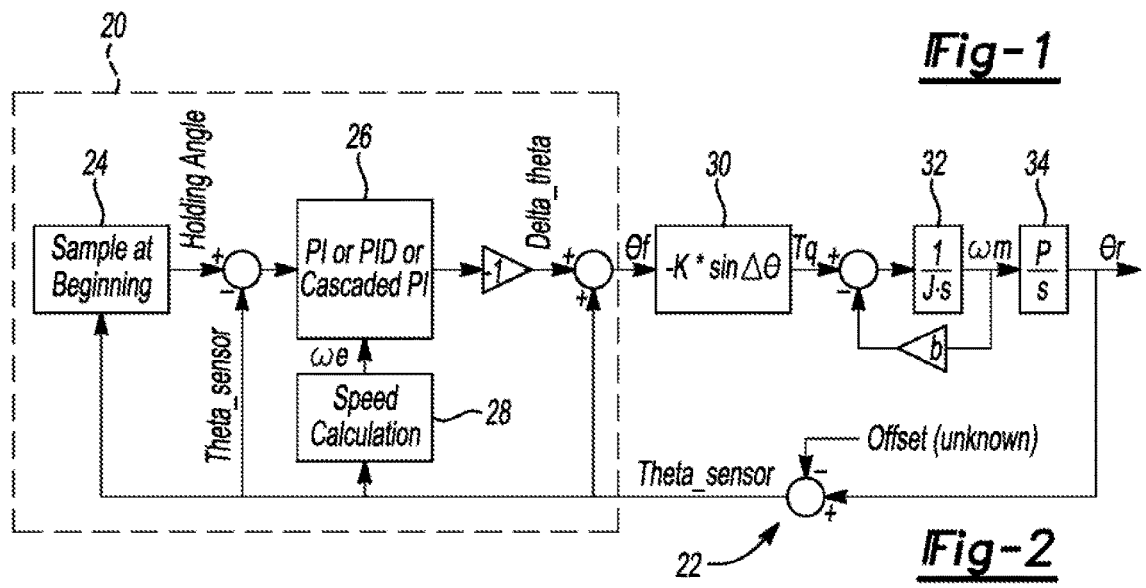
FIG. 2 is a block diagram of a position holding algorithm.

With regard to FIG. 2, the position holding control 20 includes a sample at beginning block 24, a proportional-integral (PI), proportional-integral-derivative (PID), or cascaded PI block 26, and a speed calculation block 28. Output of the position sensor 22, Theta_sensor, is fed to the sample at beginning block 24. Output of the sample at beginning block 24, holding angle, is summed with Theta_sensor. The resulting sum is fed to the PI or PID or cascaded PI block 26, which also receives output, the electric speed of the motor 12, of the speed calculation block 28. Output therefrom is fed to an inverting amplifier to produce Delta_theta, which is summed with Theta_sensor to produce θf.

The electric system associated with the motor 12, inverter 14, and PWM current controller 18 is represented as block 30, and the mechanical system associated with the motor 12 is represented as blocks 32, 34, where J is the moment of inertia of the motor 12, P is the motor number of pole-pairs as mentioned above, $\omega_m$ is the mechanical speed of the motor 12, and b is the friction coefficient of the motor 12. θf is fed to the block 30, which transforms θf to torque command, Tq. Tq is fed to block 32, 34, which transform Tq to θr, which is captured by the position sensor 22.

When the position holding control 20 reaches its steady state, the detection is done and the value of Delta_theta converges to the offset. Then, the system can bypass the proposed algorithm and switch to normal operation, using Delta_theta as the offset to control the motor. That is, the controller 16 can alter the PWM command used to perturb the rotor to cause the rotor to rotate.

In FIGS. 3A through 6B, several initial rotor angle detections are shown. Idcmd is set to −100A. Initial motor current is zero. The figures show how the actual motor current converges to the command and how the offset angle is adjusted.

Figure 3A:
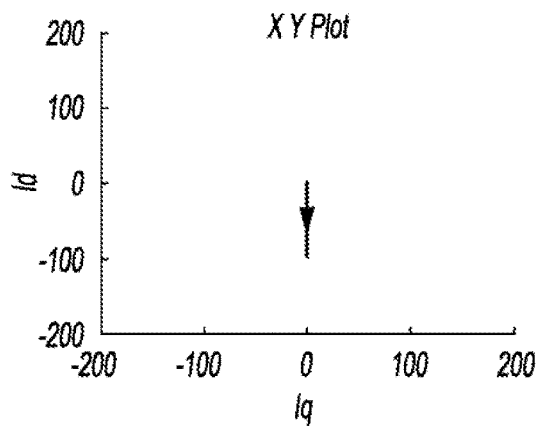
FIG. 3A is a plot of motor current during rotor perturbing with a 0° offset between a position sensor and rotor.
Figure 3B:
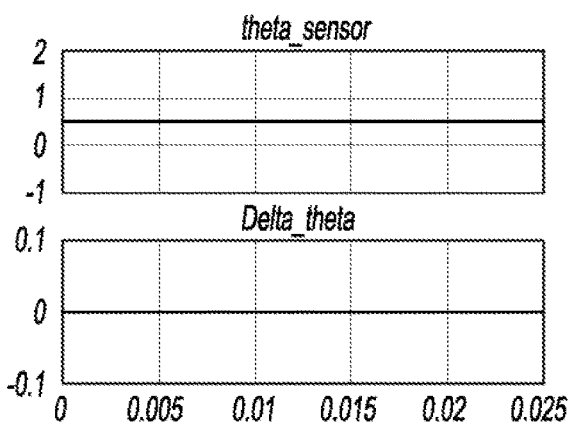
FIG. 3B is a plot of rotor position (top) and change in rotor position (bottom) during rotor perturbing with a 0° offset between a position sensor and rotor.

With regard to FIGS. 3A, 3B, the offset is 0, and the motor current starts from the origin and stays at −90 deg after that. The rotor angle does not change during the whole process because the offset is equal to 0, which means the position sensor signal is already aligned with the rotor.

Figure 4A:
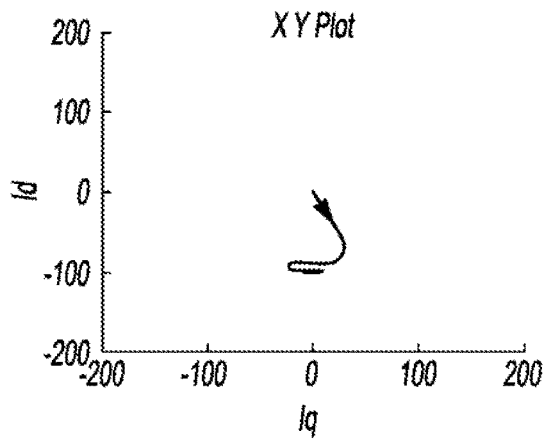
FIG. 4A is a plot of motor current during rotor perturbing with a 45° offset between a position sensor and rotor.
Figure 4B:
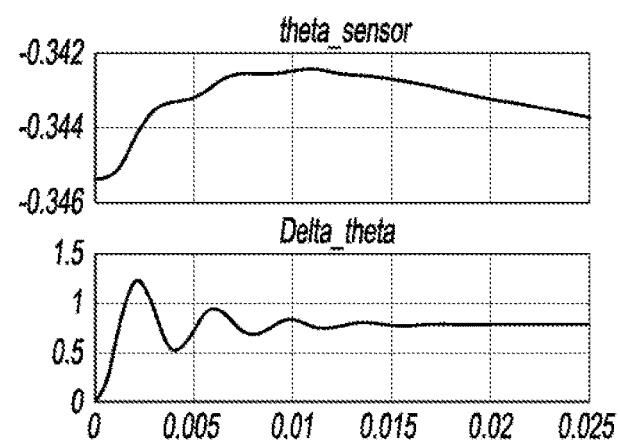
FIG. 4B is a plot of rotor position (top) and change in rotor position (bottom) during rotor perturbing with a 45° offset between a position sensor and rotor.

With regard to FIGS. 4A, 4B, the offset is 45 deg, and the motor current starts from the origin and orients toward the command with a 45 deg offset. After convergence, the current stays at the commanded value. Theta_sensor shows the rotor position change is only 0.004 rad, indicating the position holding control 20 is working properly. In addition, if given enough time, the rotor position angle will eventually go back to its initial value. Delta_theta finally converges to π/4, meaning the initial position detection is successfid.

Figure 5A:
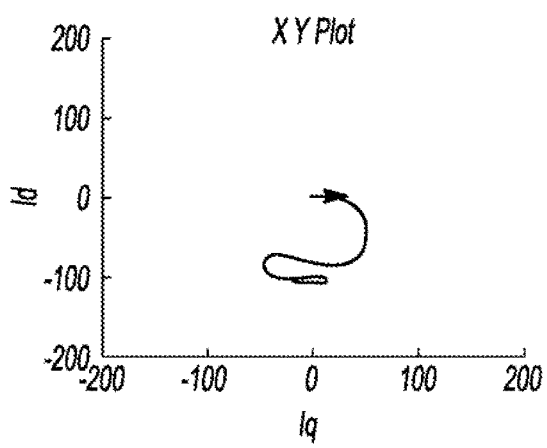
FIG. 5A is a plot of motor current during rotor perturbing with a 90° offset between a position sensor and rotor.
Figure 5B:
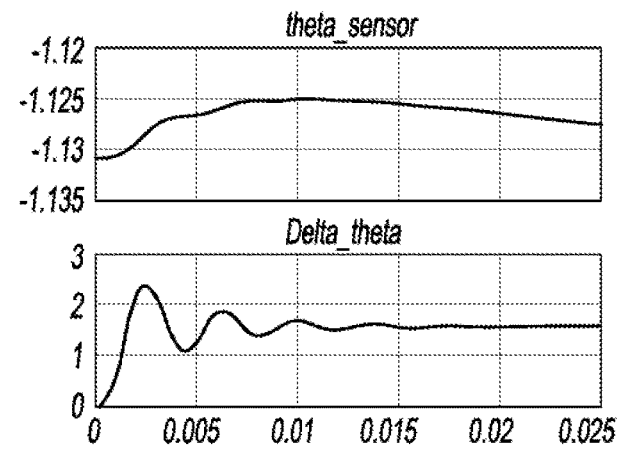
FIG. 5B is a plot of rotor position (top) and change in rotor position (bottom) during rotor perturbing with a 90° offset between a position sensor and rotor.

With regard to FIGS. 5A, 5B, the offset is 90 deg, and similar to the 45 deg offset, the initial position detection is successful for this 90 deg example. Delta_theta finally converges to π/2.

Figure 6A:
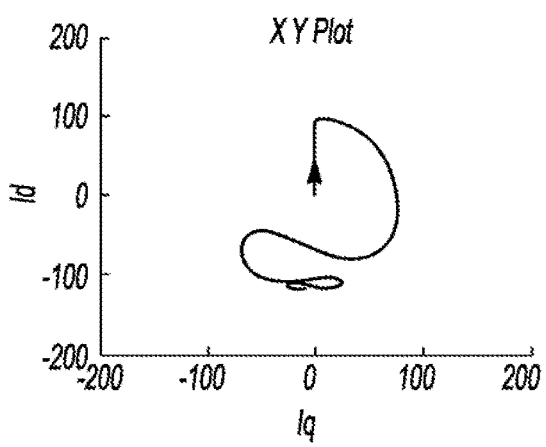
FIG. 6A is a plot of motor current during rotor perturbing with a 180° offset between a position sensor and rotor.
Figure 6B:
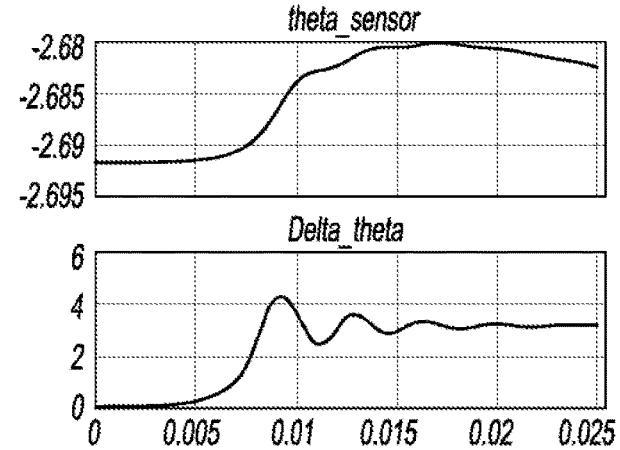
FIG. 6B is a plot of rotor position (top) and change in rotor position (bottom) during rotor perturbing with a 180° offset between a position sensor and rotor.

With regard to FIGS. 6A, 6B, the offset is 180 deg. When the rotor is aligned at 180 deg, the arbitrary d-axis current will not produce torque. However, the 180 deg is an unstable equilibrium point. At this point, the control algorithm is providing positive feedback. Any little disturbance will cause the rotor to rotate and the algorithm will converge to the correct angle. This little disturbance can be generated, for example, by giving 10A IqCmd and after a short time, changing IqCmd to 0A. In practice, the algorithm will not be able to stay at this 180 deg unstable equilibrium point. As shown in the result, the motor current starts from the origin and goes to 180 deg offset at the beginning. Then it starts to change rapidly (due to positive feedback) and transients to the expected value.

The maximum rotor angle change is 0.012 rad (i.e. 0.69 deg electric). This change is negligible in the electric vehicle. Please also notice that, if given sufficient time, the close-loop position holding control will force Theta_sensor to eventually go back to its original value.

This strategy is observable, for example, when after changing the position sensor mounting angle, the inverter controls the current of the eMotor and the current eventually orients to the actual eMotor d-axis. When this procedure is done, the eMotor can operate normally with the new position sensor angle.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gale Arrays (FPGAs), stale machines, controllers or other hardware components or devices, or a combination of hardware, software and firmware components.

The words used in the specification are words of description rather than limitation, and it is understood that various changes may be made without departing from the spirit and scope of the disclosure and claims.

As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but am not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electric drive system comprising:
    a motor including a rotor;
    an inverter; and
    a controller programmed to,
    responsive to a start-up operation, initiate a pulse width modulation (PWM) command with an arbitrary Id current command and a zero Iq current command to the inverter to perturb the rotor, and
    responsive to an Id motor current becoming negative and an Iq motor current settling at zero during the perturbing, alter the PWM command to rotate the rotor.

2. The electric drive system of claim 1 further comprising a sensor configured to detect a position of the rotor, wherein output of the sensor corresponding to the Id motor current becoming negative and the Iq motor current settling at zero defines an offset between an actual position of the rotor relative to the position detected by the sensor.

3. The electric drive system of claim 2, wherein the Iq motor current remains zero during the perturbing of the rotor responsive to the offset being 0 degrees.

4. The electric drive system of claim 2, wherein the Id motor current remains negative during the perturbing of the rotor responsive to the offset being less than 90 degrees or greater than 270 degrees.

5. The electric drive system of claim 2, wherein the Id motor current initially becomes positive before becoming negative during the perturbing responsive to the offset being greater than 90 degrees and less than 270 degrees.

6. The electric drive system of claim 2, wherein the PWM command depends on the output.

7. An electric drive system comprising:
    a motor including a rotor;
    an inverter; and
    a controller programmed to perturb a position of the rotor via a pulse width modulation (PWM) command with an arbitrary Id current command and a zero Iq current command to the inverter such that the motor receives an Id current that changes during the perturbing and an Iq current, and responsive to the Id current becoming negative and the Iq current settling at zero during the perturbing, alter the PWM command to cause the rotor to rotate.

8. The electric drive system of claim 7 further comprising a sensor configured to detect a position of the rotor, wherein output of the sensor corresponding to the Id current becoming negative and the Iq current settling at zero defines an offset between an actual position of the rotor relative to the position detected by the sensor.

9. The electric drive system of claim 8, wherein the Iq current remains zero during the perturbing of the rotor responsive to the offset being 0 degrees.

10. The electric drive system of claim 8, wherein the Id current remains negative during the perturbing of the rotor responsive to the offset being less than 90 degrees or greater than 270 degrees.

11. The electric drive system of claim 8, wherein the Id current initially becomes positive before becoming negative during the perturbing responsive to the offset being greater than 90 degrees and less than 270 degrees.

12. The electric drive system of claim 8, wherein the PWM command depends on the output.

13. A method for operating an electric drive system comprising:
    by a controller,
    initiating a pulse width modulation (PWM) command with an arbitrary Id current command and a zero Iq current command to an inverter to perturb a rotor responsive to a start-up operation, and
    altering the PWM command to rotate the rotor responsive to an Id motor current becoming negative and an Iq motor current settling at zero during the perturbing.

14. The method of claim 13, wherein output of a sensor configured to detect a position of the rotor and corresponding to the Id motor current becoming negative and the Iq motor current settling at zero defines an offset between an actual position of the rotor relative to the position detected by the sensor.

15. The method of claim 14, wherein the Iq motor current remains zero during the perturbing of the rotor responsive to the offset being 0 degrees.

16. The method of claim 14, wherein the Id motor current remains negative during the perturbing of the rotor responsive to the offset being less than 90 degrees or greater than 270 degrees.

17. The method of claim 14, wherein the Id motor current initially becomes positive before becoming negative during the perturbing responsive to the offset being greater than 90 degrees and less than 270 degrees.

18. The method of claim 14, wherein the PWM command depends on the output.

19. The method of claim 13, wherein a time between the initiating and the altering is less than 1 second.

* * * * *